(12) United States Patent
Neal et al.

(10) Patent No.: US 7,341,272 B2
(45) Date of Patent: Mar. 11, 2008

(54) EXPANDING INDEPENDENT LOAD SUSPENSION SYSTEM

(76) Inventors: Robert P. Neal, 1915 Olivebrook Ct., El Cajon, CA (US) 92019; Troy N. Patterson, 3151 Peg Leg Mine Rd., Jamul, CA (US) 91935

( * ) Notice: Subject to any disclaimer, the term of this patent is extended or adjusted under 35 U.S.C. 154(b) by 432 days.

(21) Appl. No.: 11/084,639

(22) Filed: Mar. 18, 2005

(65) Prior Publication Data

US 2006/0208463 A1   Sep. 21, 2006

(51) Int. Cl.
*B60G 5/00* (2006.01)
(52) U.S. Cl. .................. 280/677; 280/124.116
(58) Field of Classification Search ............... 200/676, 200/677, 678, 786, 86.5, 124.123, 124.111, 200/124.116
See application file for complete search history.

(56) References Cited

U.S. PATENT DOCUMENTS 3,101,958 A * 8/1963 Geron ..................... 280/423.1
3,162,464 A * 12/1964 Woolslayer et al. ........ 280/679

* cited by examiner

*Primary Examiner*—Ruth Ilan
*Assistant Examiner*—Tiffany L. Webb
(74) *Attorney, Agent, or Firm*—Richard D. Clarke

(57) ABSTRACT

An expanding independent load suspension system that incorporates a square walking beam, unique bushings, and multiple expanding sliding units to spread the load bearing tires evenly over the surface instead of grouping them close together. With the weight of the vehicle having the ability to pivot over three separate axes, it maintains an equal pressure on all the tires no matter what the surface conditions. Additional benefits are derived by the separation of the tires with the new design of the square walking beam causing less damage to the roadways. The vehicle has been designed to operate on the highways in the conventional ten-foot width, and then expand to a maximum of twenty feet to move large loads with the permits required.

20 Claims, 11 Drawing Sheets

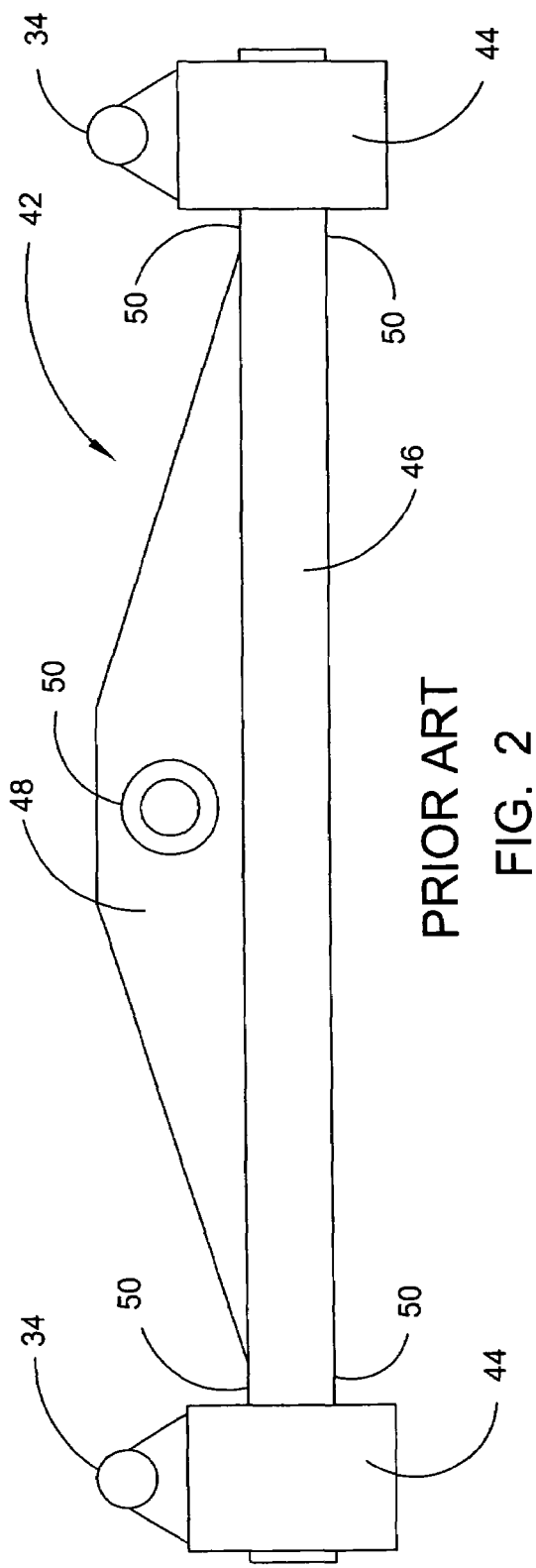
PRIOR ART
FIG. 2
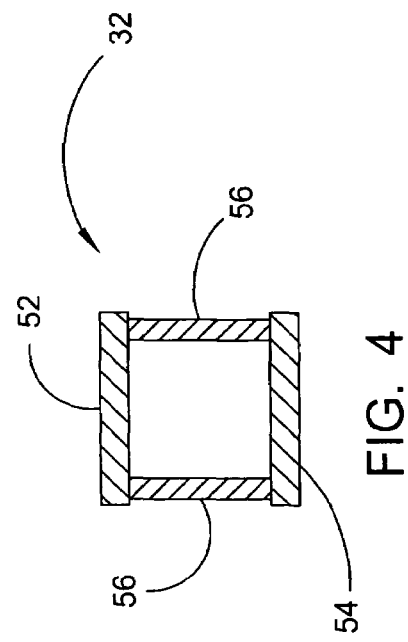
FIG. 4
PRIOR ART
FIG. 3

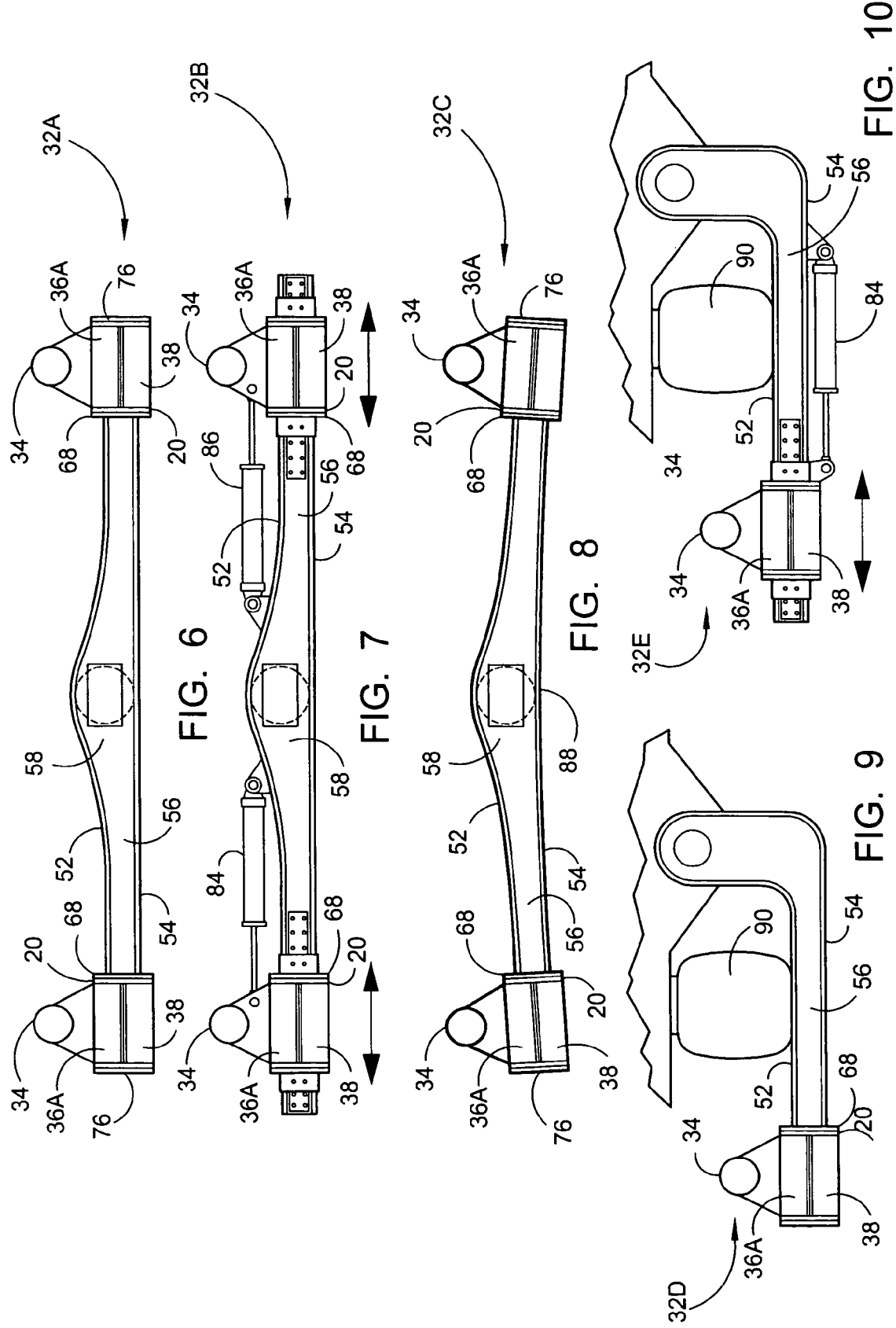

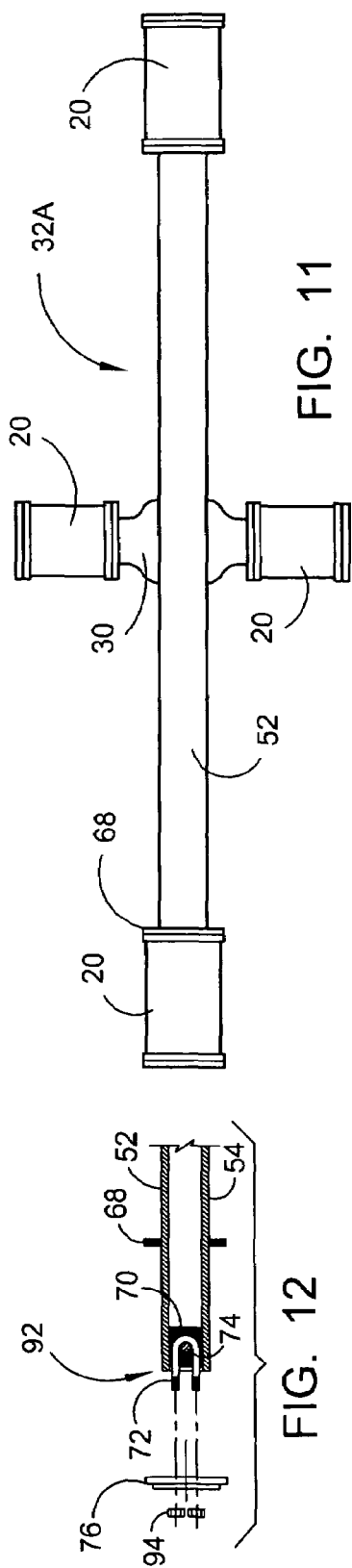

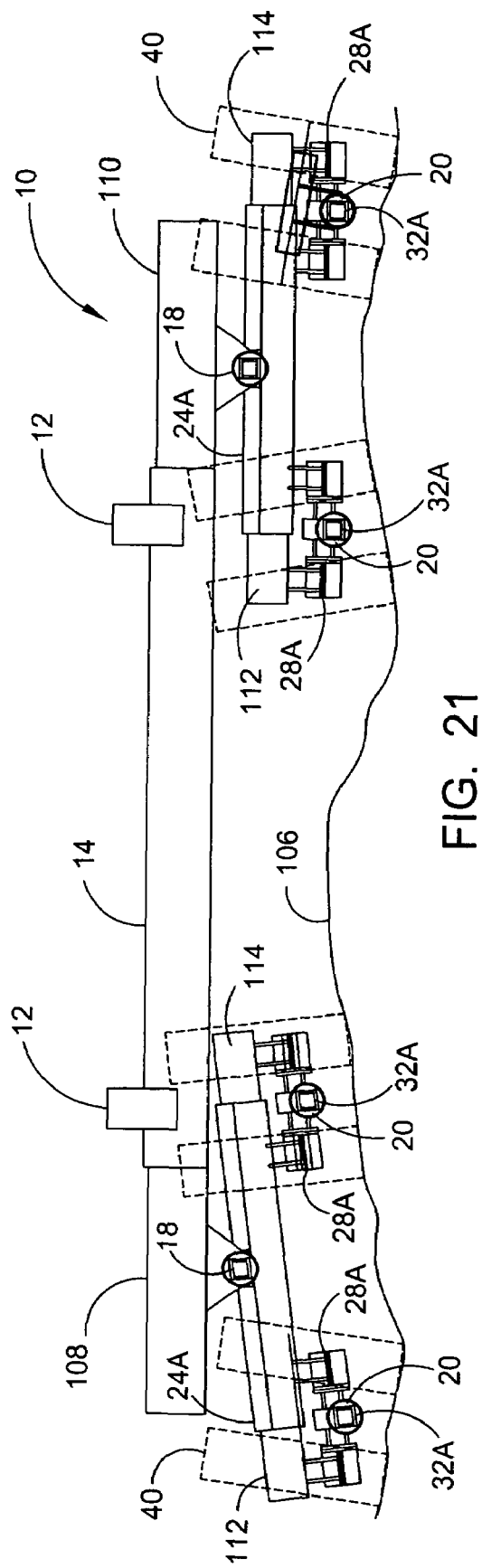
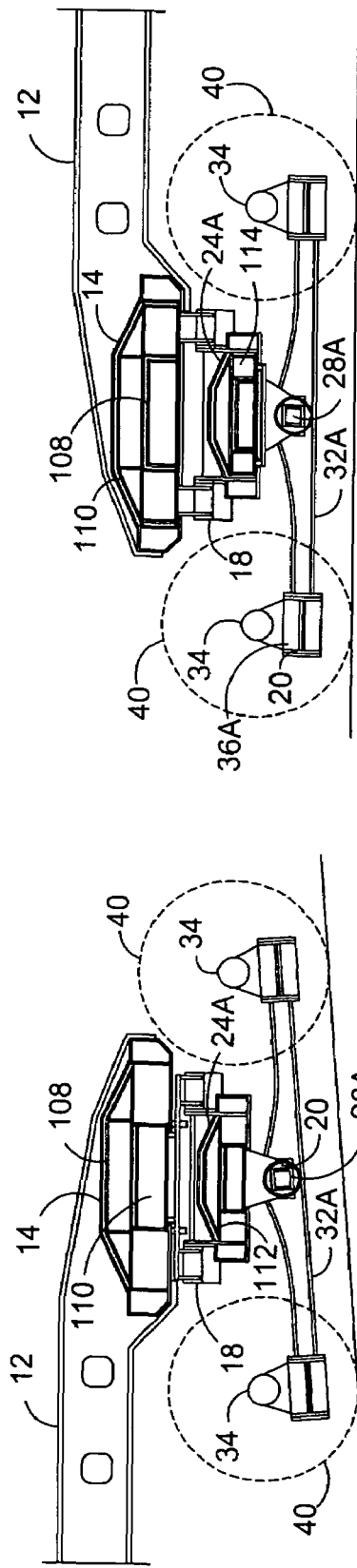
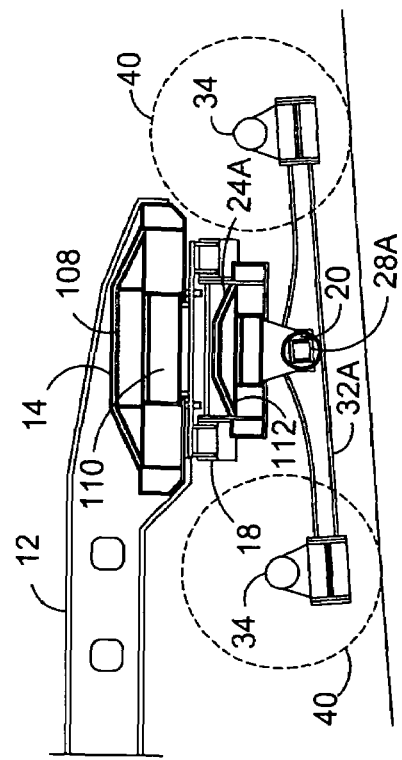
FIG. 21
FIG. 22
FIG. 23

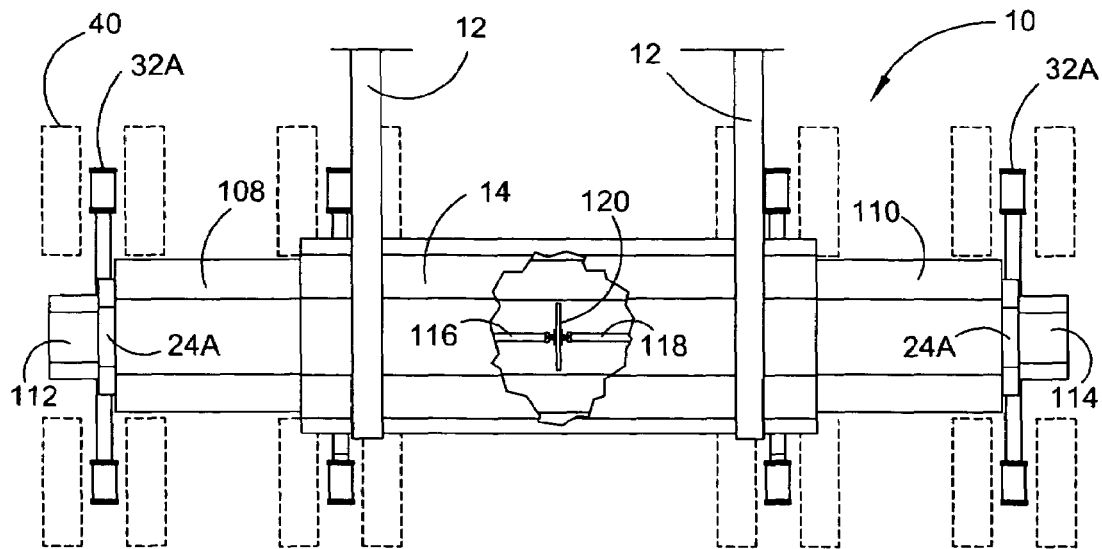
FIG. 24
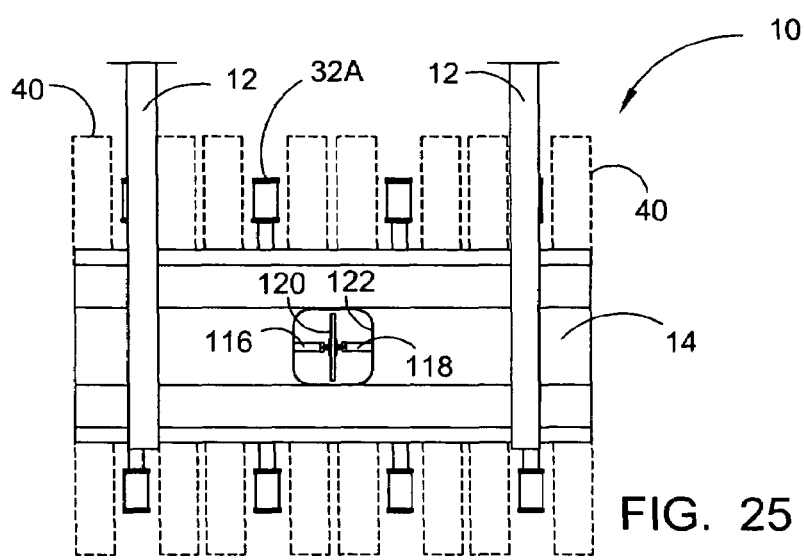
FIG. 25
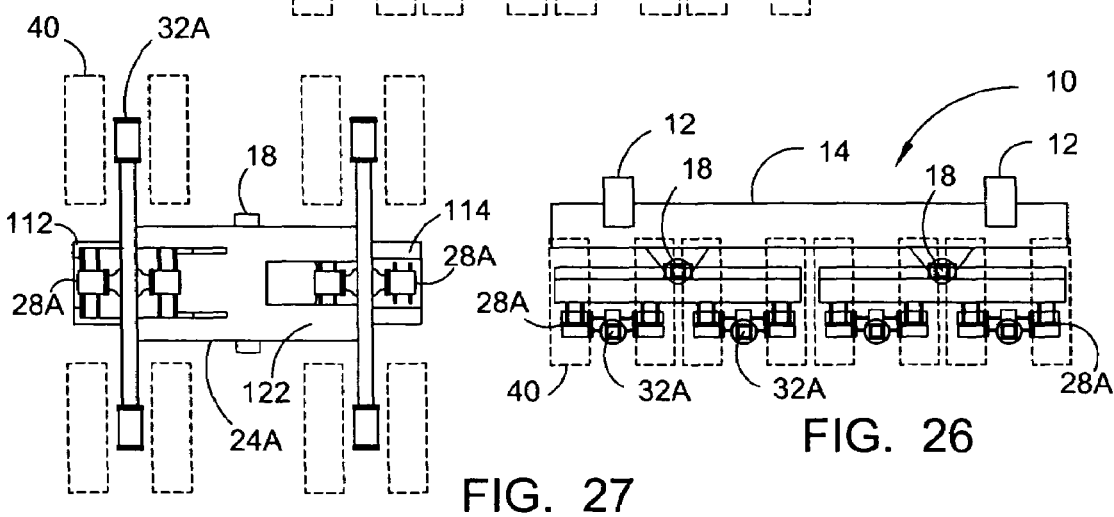
FIG. 26
FIG. 27

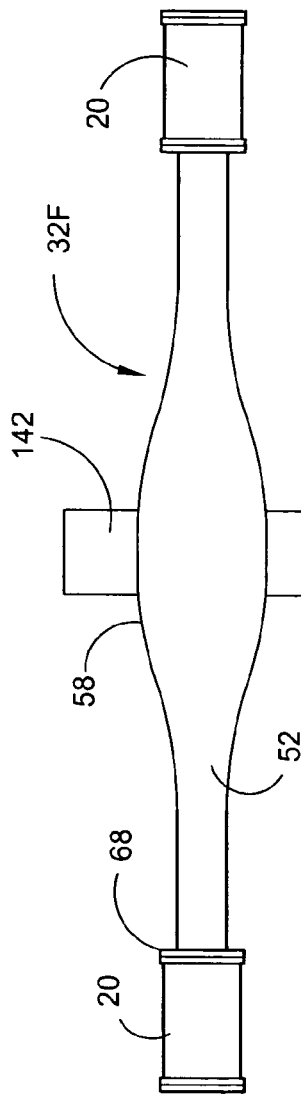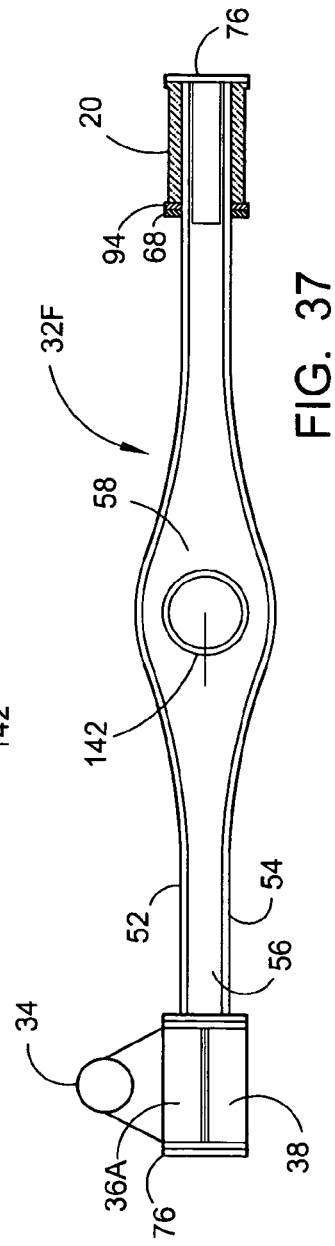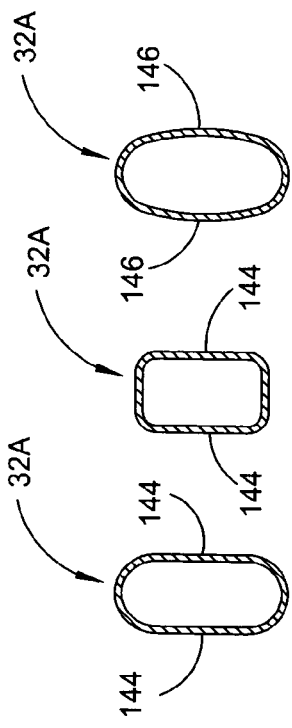

EXPANDING INDEPENDENT LOAD SUSPENSION SYSTEM

FIELD OF THE INVENTION

This invention relates to the field of suspension systems to be used on a variety of different load carrying transport vehicles. More specifically, this patent deals with vehicles having multiple axel and tire groupings used to carry heavy loads. The expansion of these vehicles in the past has been limited due to the uneven distribution of the load weight over the wheels, which are normally clustered together. Additionally, some of the wide load carrying vehicles must be disassembled for transport to the location where the load must be transported from, assembled to transport the load, then disassembled again for the return. This patent offers a new and unique suspension system that keeps the tires evenly spaced over the surface both front to back and side to side along with equalizing the weight distributed to each of the tires even on uneven surfaces no matter how wide the vehicle is spread.

BACKGROUND OF THE INVENTION

The inventors of this Expanding Independent Load Suspension System operate a trucking firm specifically directed at heavy hauling. That is the transport of larger than average loads. Because of road safety and weight limitations, state and federal authorities have adopted highway weight distribution formulae and regulations which determine legal load limits for load carrying vehicles, the manner in which the load carrying vehicles may traverse a highway, and the weight distribution of load-carrying vehicles over the pavement. Additional stringent laws may vary from state to state, allowing that some vehicles legal in one state will not be legal in another due to wheel location or load displacement.

Typically, these weight distribution formulae are used to prescribe load limits for individual axles or axle clusters and the distribution of the load weight over the surface. Very heavy loads exceeding the regulated weight limits often require special permits from state authorities. Although criteria for these permits may vary from state to state, the load-carrying vehicles must normally comply with a distribution formula determined by the government authorities for safe travel across highways. Another common problem is the hauling of massive loads over bridges. Loads normally cannot traverse a bridge span when they exceed 60,000 lbs. per span. In some cases, the vehicles used to move the large loads must be disassembled and moved to the location prior to moving the load. Other problems occur with slopes in the surface either to the front or back or to the side, where the weight is not equally distributed to all of the tires evenly. Breaking of the vehicle also shifts the weight distribution on the vehicle. This uneven distribution of weight may greatly exceed the highway weight limit and the weight limit on individual tires of the vehicle. An unforeseen problem in existing vehicles is by the manufacturer increasing the rigidity of the suspension system. When the vehicle leans to the side a great deal of the weight is transmitted to the outside tires, exceeding predetermined load limits. Conventional systems couple tires together in a dual tire configuration. This invention separates each tire by the means of the walking beam location between the tires also leaving room for additional breaking mechanisms. A unique expansion system has been devised with expanding sliding units that spread the axle clusters apart. By separating the tires, and further separating the axel clusters as the vehicle is expanded, the load weight is spread over a uniform area on the surface no matter how wide the system has been spread.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

This invention describes a new and unique expanding independent load suspension system that distributes the load weight over a broader area than the conventional vehicles used in the field of hauling heavy loads. This is accomplished by evenly spacing the tires out, no matter how wide the vehicle has been spread. By having variable dimensions in the suspension system it will enable infinite adjustment of the wheel locations to avail maximum loads allowed, as required by law. The infinite adjustment of the expanding independent load suspension system means that any segment of the system may be adjusted independently, either manually or electronically by the means of switches or valves. The system can also be completely computer controlled to compensate for varying roadway conditions or load sizes.

In addition, the expanding independent load suspension system incorporates a new style of square-walking beam and expanding sliding units to accomplish this task. The preferred embodiment of the square walking beam in combination with unique bushings used on the walking beam at the axle mount and trunnions keeps all the tires in equal contact with the surface. By pivoting on three separate axes, the load is evenly distributed no matter what the surface conditions. The square walking beam uses a cylindrical bushing with a preferably square orifice, although the orifice may be rectangular, may have radiuses in the corners, or would not be limited to being in any geometric shape with flat or curved sides and will still fall within the scope of this patent. The bushings, having a square orifice, allows for tapered shims to be optionally inserted on the sides of the square walking beam to adjust wheel and axle alignment or may be manufactured with a variety of existing alignment adjusting configurations. These bushings may be manufactured in one piece or may be split in two halves reducing the manufacturing costs.

The axle mounting brackets will consist of a split clamp making replacing or shimming the bushing an easy process or of a singular tubular element. An added benefit to having the square orifice in the bushing is that conventional bushings normally wear out on the inside diameter because there is less surface area on the inside diameter than the outside. By using a square orifice the bushings are forced to turn on the outer diameter making them last longer.

The square walking beam being constructed of flat stock can gradually thicken either in height or width approaching the central mounting area of the trunnion depending upon the weight the beam has been designed to carry, eliminating stress risers that normally occur at abrupt structural changes or abrupt changes in contour. It must be clarified that although the walking beam has been designated as a square walking beam, it along with the orifice in the bushing, may be rectangular, may have radiuses on the corners or would not be limited to being in any geometric shape with flat, or approaching flat or curved sides and will still fall within the scope of this patent. Additionally, the square walking beam may have different thickness in the material used on the top and bottom from that on the sides, reducing the weight. The square walking beam can also be fabricated with a preload bow in it similar to what is done on some of the flat bed trailers. The preload bow is designed to flex to a straight configuration under a load. This flexing of the beam cushions some of the shock of bumps creating an easier ride for the vehicle and minimizes some of the damage done by rigidly resisting shock forces incurred on the road.

An alternate embodiment of the square walking beam will incorporate longitudinal adjustment of the bushing mounts at the ends of the beam to vary the centerline spacing of the axles. This adjustment would most commonly be made with hydraulic cylinders, but could also be accomplished with a variety of conventional mechanisms including air or screw drive mechanisms. The adjustment to spread the axles apart can also vary the ride condition by extending the bushings and axle mounts apart for a softer ride or bringing them together for a firmer ride. This unique feature can also be incorporated into a single axle suspension beam in the square configuration, with or without the hydraulically actuated longitudinal adjustment of the bushing mount.

The expansion of the expanding independent load suspension system is accomplished by the means of multiple sliding units that expand the vehicle laterally. The sliding units are composed of similar central box members and two opposing sliding sections that extend in opposite directions. The primary box member is fixably attached to the frame of the vehicle with the primary sliding sections extending by the means of hydraulic cylinders or similar conventional mechanisms. Centrally located on the bottom on each primary sliding section will be the primary trunnions for the primary square journals mounted on the secondary box members containing the secondary sliding sections. The centerline of the primary trunnions on the primary sliding sections will be parallel to the frame of the vehicle allowing the secondary box member to pivot on the X-axis as indicated on the drawings. The secondary box members will have the opposing secondary sliding sections also extended by the means of hydraulic cylinders or similar conventional mechanisms. Centrally located on the opposing secondary sliding sections will be the secondary trunnions for the secondary square journals and bushings mounted on the square walking beam. The centerlines of the secondary trunnions are perpendicular to the frame of the vehicle allowing the walking beam to pivot on the Y-axis as indicated in the drawings. Teflon pressure pads will be placed in a variety of locations on primary sliding sections and the secondary sliding sections to assure a smooth sliding action within the box members. The bushings at the ends of the walking beams will allow the axles to pivot on the Z-axis as indicated in the drawings. With the weight of the vehicle having the ability to pivot over three axes, it maintains an equal pressure on the tires no matter what the surface conditions. Additional benefits are derived by the separation of the tires by the square walking beam.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

SUMMARY OF THE INVENTION

The principal advantage of the expanding independent load suspension system is to create a vehicle of a conventional width with expanding capabilities.

Another advantage of the invention is to create an expanding vehicle that will distribute the load evenly over the road surface.

Another advantage of the invention is to create an expanding vehicle that can carry a heavy load that does not have an excessive amount of structural weight.

Another advantage of the invention is to create an expanding independent load suspension system with the ability to offset the support to compensate for side slope or super elevation in highway curves.

Another advantage of the invention is to be able to slide axles in or out to clear road obstacles curbs, cars or high wires.

Another advantage of the invention is to eliminate the attachment of the wheels together as in the conventional dual wheel concept that concentrates the load in a small uneven footprint on the surface.

Another advantage of the invention is to create a unique walking beam on an axel cluster that has flat surface areas on the sides instead of round.

Another advantage of the invention is to create a square walking beam that will have no stress risers over the entire length.

Another advantage of the invention is to create a square walking beam that is economical to build, lighter weight and will be able to carry a heavier load.

Another advantage of the invention is to create a square walking beam that can be constructed with a pre-load bow in it.

Another advantage of the invention is to create a square walking beam where the bushings and bushing mounts are adjustable to vary the spread of the axels attached to the walking beam ends.

Another advantage of the invention is to create a round bushing that has an orifice to match the configuration of the walking beam design.

Another advantage of the invention is to create an easily replaced bushing system for transport vehicles.

Another advantage of this invention is to create a round bushing with an orifice that can be shimmed to adjust wheel and axel alignment.

A further advantage of this invention is to create a round bushing with a square orifice that can be used on the pivoting square journals at the trunnion locations.

Yet, another advantage of this invention is to create an expanding vehicle with one or more expandable sliding units.

Still another advantage of this invention is to create an expanding vehicle with expanding sliding units that adjust the positions of the trunnions to equally spread the tire locations apart when the vehicle is expanded.

And still another advantage of this invention is to create an expanding vehicle with trunnions and bushings pivoting on three different axes, maintaining equal contact pressure with the surface by all the tires on the vehicle.

A final advantage is to create a load suspension system that improves the weight distribution of all load-carrying vehicles and reduces pavement damage on the highway by these vehicles.

An expanding independent load suspension system that incorporates a square walking beam, unique bushings, and multiple expanding sliding units to spread the load bearing tires evenly over the surface instead of grouping them close together. With the weight of the vehicle having the ability to pivot over three separate axes, it maintains an equal pressure on all the tires no matter what the surface conditions. Additional benefits are derived by the separation of the tires with the new design of the square walking beam causing less damage to the roadways. The vehicle has been designed to operate on the highways in the conventional ten-foot width, and then expand to a maximum of twenty feet to move large loads with the permits required.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The accompanying drawings, which are incorporated in and form a part of this specification, illustrate embodiments of the invention and together with the description, serve to explain the advantages of this invention.

FIG. 2 depicts the prior art in a rear view of the typical walking beam configuration;

FIG. 3 depicts a cross sectional view of a tubular support member walking beam in the prior art;

FIG. 4 depicts a cross section of the square walking beam, constructed in accordance with the present invention;

FIG. 6 depicts a side view of a square walking beam, constructed in accordance with the present invention;

FIG. 7 depicts a side view of an alternate embodiment of the square walking beam with hydraulically actuated longitudinal adjustment of the bushing mounts, constructed in accordance with the present invention;

FIG. 8 depicts a side view of a second alternate embodiment of the square walking beam with a pre-load bow in it, constructed in accordance with the present invention;

FIG. 9 depicts a side view of a single axle suspension beam in the square configuration, constructed in accordance with the present invention;

FIG. 10 depicts an alternate embodiment of the single axle suspension beam in the square configuration with hydraulically actuated longitudinal adjustment of the bushing mount, constructed in accordance with the present invention;

FIG. 11 depicts a top view of a square walking beam illustrating the secondary square journal and bushings, constructed in accordance with the present invention;

FIG. 12 depicts a cross section through one end of the square walking beam illustrating the cushioned bushing retainer, constructed in accordance with the present invention;

FIG. 13 depicts a side view of the square walking beam with the bushing in cross section, constructed in accordance with the present invention;

FIG. 14 depicts an end view of the axle mounting bracket with the split clamp exploded down, constructed in accordance with the present invention;

FIG. 15 depicts a side view of the round bushing with the square orifice, constructed in accordance with the present invention;

FIG. 16 depicts an end view of the round bushing with the square orifice, constructed in accordance with the present invention;

FIG. 17 depicts an end view of the square walking beam, the secondary square journal and bushings, constructed in accordance with the present invention;

FIG. 18 depicts a top view of the secondary square journal, constructed in accordance with the present invention;

FIG. 19 depicts an end view of the secondary square journal, constructed in accordance with the present invention;

FIG. 20 depicts a side view of the alternate embodiment of the axle mounting bracket, constructed in accordance with the present invention;

FIG. 21 depicts the expanded back view of the expanding independent load suspension system, constructed in accordance with the present invention;

FIG. 22 depicts a right side view of the expanding independent load suspension system, constructed in accordance with the present invention;

FIG. 23 depicts a left side view of the expanding independent load suspension system, constructed in accordance with the present invention;

FIG. 24 depicts an expanded top view of the expanding independent load suspension system, constructed in accordance with the present invention;

FIG. 25 depicts a retracted top view of the expanding independent load suspension system, constructed in accordance with the present invention;

FIG. 26 depicts a retracted back view of the expanding independent load suspension system, constructed in accordance with the present invention;

FIG. 27 depicts a bottom view of one secondary box member with the secondary sliding sections extended, constructed in accordance with the present invention;

FIG. 36 depicts a top view of the square walking beam with expanded central section, constructed in accordance with the present invention;

FIG. 37 depicts a side view of the square walking beam with expanded central section, constructed in accordance with the present invention;

FIG. 38 depicts a section through a walking beam with flat sides and circular top and bottom, constructed in accordance with the present invention;

FIG. 39 depicts a section through a walking beam with flat sides and radius corners on the top and bottom, constructed in accordance with the present invention; and FIG. 40 depicts a section through an oval shaped walking beam, constructed in accordance with the present invention.

DETAILED DESCRIPTION OF THE PREFERRED EMBODIMENTS

Figure 1:
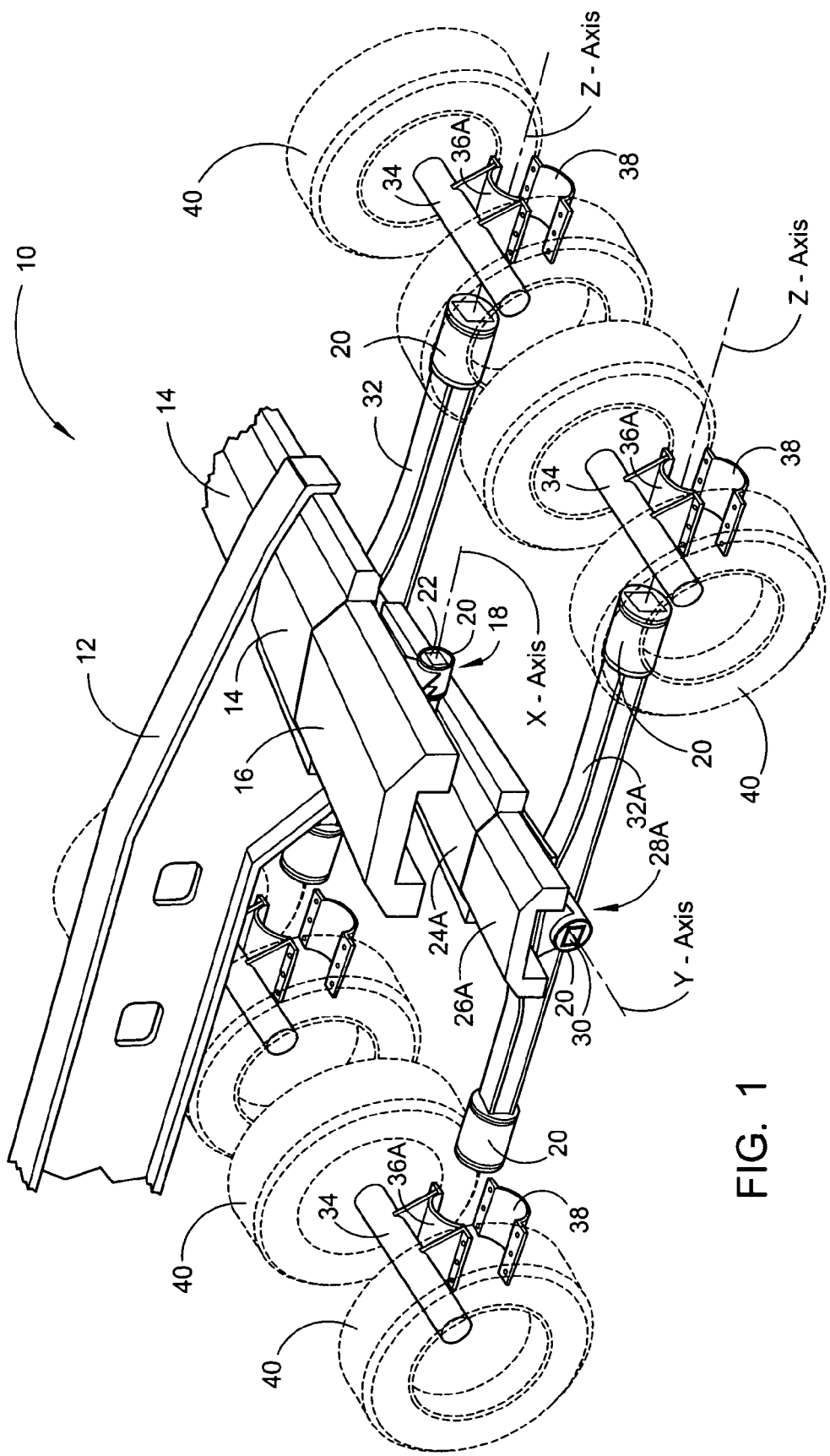
FIG. 1 depicts a perspective drawing of one side of the expanding independent load suspension system, constructed in accordance with the present invention.

Referring now to the drawings, wherein similar parts of the expanding independent load suspension system 10 are identified by like reference numerals, there is seen in FIG. 1 a perspective drawing of one side of the expanding independent load suspension system 10 illustrating a conventional frame member 12 fixably attached to the primary box member 14. It must be understood only half of the vehicle has been depicted in the illustration and below this point there will be two or more of each of the items depicted unless otherwise indicated. One of the opposing sliding sections 16 is shown in the extended position. Below the primary sliding sections 16 is one of the primary trunnions 18, housing the bushing 20 and one of the primary square journals 22. The primary square journals 22 will pivot about the X-axis that is parallel to the frame of the vehicle. The primary journals 22 are fixably attached to the top of the secondary box members 24A shown with one of the secondary sliding sections 26A extended. Below the secondary sliding section, 26A is shown one of the secondary trunnions 28A composed of a bushing 20 and the secondary square journal 30. The secondary square journal 30 will pivot about the Y-axis that is perpendicular to the frame 12 of the vehicle. The secondary square journal 30 will be fixably attached to the center of the square walking beam 32A with bushings 20 at either end. The bushings 20 at the ends of the walking beams 32A are mounted to the axle 34 by the means of the mounting bracket 36A with a split clamp 38. The axle 34 with the wheels 40 attached, will pivot about the Z-axis additionally parallel to the frame 12 of the vehicle.

FIG. 2 depicts the prior art in a side view of the typical walking beam 42 with the axle mounting brackets 44 at each end of the tubular member 46. Welded across the top are one or more angular mounting members 48 leaving the areas 50 where the stress risers most often occur. These abrupt structural changes or abrupt changes in contour increase stress risers that cause metal fatigue in small areas illustrated in FIG. 3 and will eventually lead to cracking. FIG. 4 illustrates a section through the end of the square walking beam 32A indicating the flat top wall 52 and the flat bottom wall 54 with the flat side walls 56. This view clarifies that the top wall 52 and bottom wall 54 where the major stresses occur will be thicker and the side walls 56 where less stress occurs will be of a thinner material. It must be also noted that the stress is spread over a wider area of the top wall 52 and bottom wall 54, without any abrupt structural changes or abrupt changes in contour, than on the tubular member 46.

Figure 5:
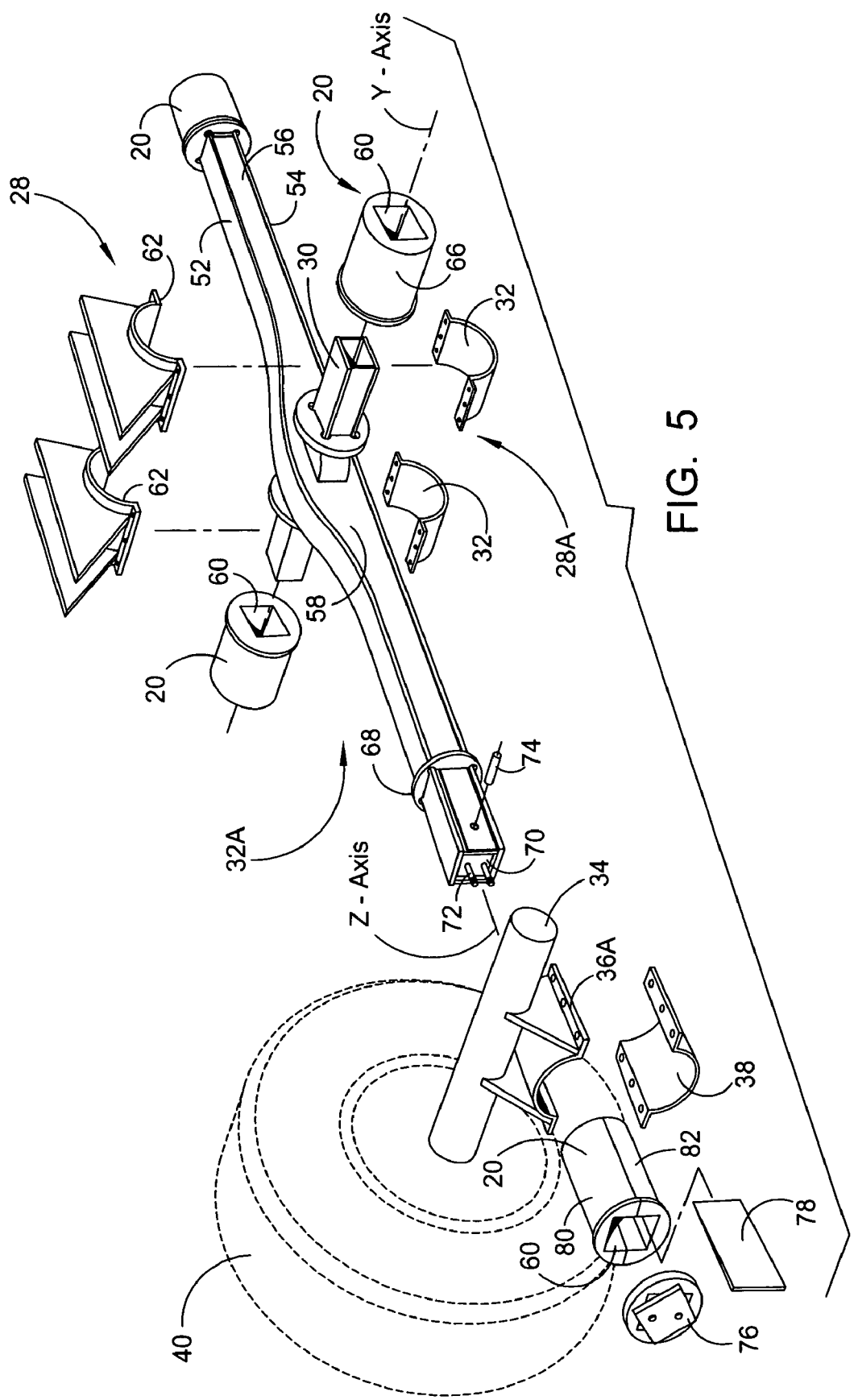
FIG. 5 depicts an exploded view of the square walking beam, the axle mounting bracket and the secondary trunnion and bushings, constructed in accordance with the present invention.

FIG. 5 depicts an exploded view of the square walking beam 32A with the flat top wall 52 and the flat bottom wall 54 and flat side walls 56 gradually enlarging in the central section 58 where the secondary square journal 30 is fixably attached. The height and width of the central section 58 of the square walking beam may vary depending upon the design requirements for different load carrying capabilities. Bushings 20 slide over the ends of the secondary square journal 30 by the means of the square orifice 60 and are held to the secondary trunnions 28A mounting bracket 62 by the means of the split clamp 64 over the round exterior surface 66. At the distal ends of the square walking beam 32A are bushings 20 with the supporting axle mounting brackets 36A. The near end has been exploded away to reveal the bushing stop plate 68 and rubber cushion mount 70, the retainer U-bolt 72 and the keeper pin 74. The bushing 20 slides over the square walking beam 32A by the means of the matching square orifice 60 to be held in place by the bushing retainer plate 76. Tapered shims 78 can be inserted into one or both sides of bushing 20 to adjust the alignment of the wheels 40 and axles 34. The bushing 20 can be manufactured in one piece or can have a top half 80 and a bottom half 82. Additionally the bushing 20 can be manufactured with the square orifice 60 off center or with tapered sides, so that by rotating, alignment corrections may be made or the bushings exterior round surface 66 could be made eccentric to the centerline of the square orifice 60 for alignment corrections. The bushings 20 will be cut to length as required. All the modifications and variations mentioned to the bushing 20 will be covered within the scope of the patent.

FIG. 6 illustrates the simplest version or preferred embodiment of the square walking beam 32A with the flat top wall 52 and the flat bottom wall 54 with the flat side walls 56, the enlarged central section 58. The stop plate is fixably attached to the square walking beam 32A to locate the bushing held in place by the bushing retainer plate 76. Axle mounting brackets 36A with the axles 34 over the bushings 20 are shown at each end of the square walking beam 32A.

FIG. 7 depicts a side view of an alternate embodiment in the square walking beam 32B with hydraulically actuated longitudinal adjustment of the bushing mounts by hydraulic cylinders 84 and 86. FIG. 8 depicts a side view of a second alternate embodiment in the square walking beam 32C, with a pre-load bow 88 curving the ends of the beam down. FIG. 9 depicts a side view of a single axle suspension beam 32D in the square configuration with an air bag 90 as a cushion support. FIG. 10 depicts an alternate embodiment of the single axle suspension beam 32E in the square configuration with hydraulically actuated longitudinal adjustment of the bushing mount by the means of the hydraulic cylinder 84.

FIG. 11 depicts a top view of a square walking beam 32A illustrating the secondary square journal 30 and bushings 20. FIG. 12 depicts a cross section through one end of the square waking beam 32A illustrating the cushioned bushing retainer 92 comprised of the rubber cushion mount 70, retainer U-bolt 72, the keeper pin 74 and the mounting nuts 94 holding in place the bushing retainer plate 76.

FIG. 13 depicts a side view of the square walking beam 32A with the bushing 20 in cross section with the optional composition spacer 96. FIG. 14 depicts an end view of the axle mounting bracket 36A with the axle 34 and the split clamp 38 exploded down.

FIG. 15 depicts a side view of the round bushing 20 with the square orifice 60 and a flange 98. The bushing 20 may be manufactured in one piece or may have a top half 80 and bottom half 82. Bushing 20 will be cut to length as required. FIG. 16 depicts an end view of the round bushing 20 with the square orifice 60.

FIG. 17 depicts an end view of the square walking beam 32A, the secondary square journal 30 and bushings 20. FIG. 18 depicts a top view of the secondary square journal 30 illustrating the secondary square journal top plate 100 and the two bushing stop plates 102. FIG. 19 depicts an end view of the secondary square journal 30, the secondary journal top and bottom plates 100 and 104. FIG. 20 depicts a side view of the alternate embodiment of the axle mounting bracket 36B comprised of one piece, not having the split clamp 38.

FIG. 21 depicts the expanded back view of the expanding independent load suspension system 10 where the surface contours 106 have been exaggerated to show the flexibility of the system. The primary box member 14 remains basically level with the left primary sliding section 108 with the right primary sliding section 110 shown in the extended position. The secondary box member 24A on the left side is shown pivoting on the primary trunnion 18 with the left secondary sliding section 112 and the right secondary sliding section 114 in the extended position. The wheels 40 are shown pivoting in the bushing 20 on the end of the square walking beam 32A. The secondary box member 24A on the right side is shown pivoting on the primary trunnion 18 with the left secondary sliding section 112 and the right sliding section 114 in the extended position. On the right side the axles 34 and the axle mounting bracket 36A are depicted. The wheels 40 are shown pivoting in the bushing 20 on the end of the square walking beam 32A.

FIG. 22 depicts a right side view of the expanding independent load suspension system 10. FIG. 23 depicts a left side view of the Expanding Independent Load Suspension System 10 shown with the square walking beam 32A pivoting on the bushing 20 on an uneven surface. FIG. 24 depicts an expanded top view of the expanding independent load suspension system 10 with the center of the primary box member 14 broken away to show the two hydraulic cylinders 116 and 118 used to extend the left primary sliding section 108 and the right primary sliding section 110 by pushing against the central support plate 120 that is fixably attached in the center of the primary box member 14.

FIG. 25 depicts retracted top view of the expanding independent load suspension system 10 showing the orifice 122 in the top of the primary box member 14 for the hydraulic lines going to the hydraulic cylinders 116 and 118.

FIG. 26 depicts a retracted back view of the expanding independent load suspension system 10. FIG. 27 depicts a bottom view of one secondary box members with the secondary sliding sections 112 and 114 extended.

Figure 28:
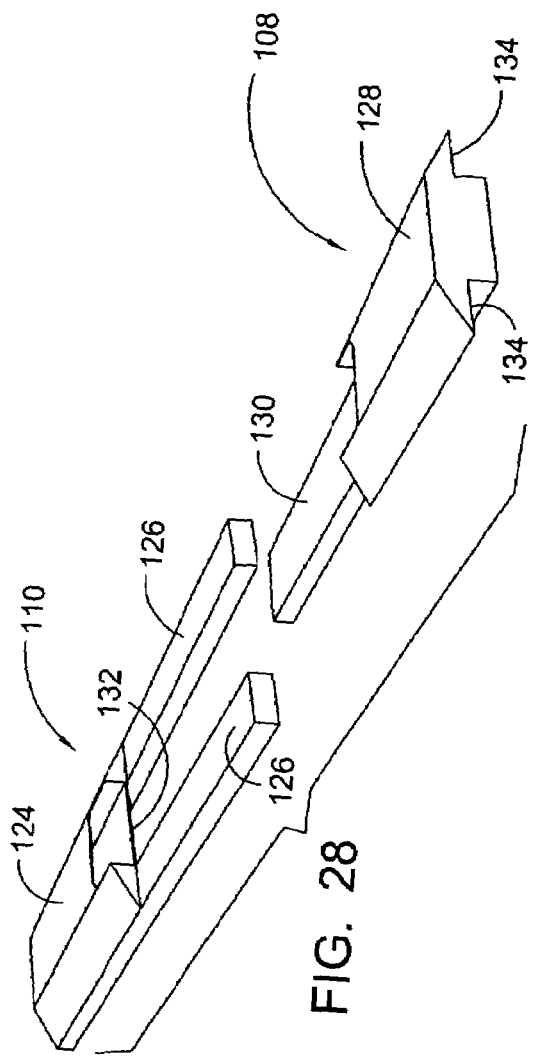
FIG. 28 depicts an exploded perspective view of the primary sliding sections, constructed in accordance with the present invention.
Figure 29:
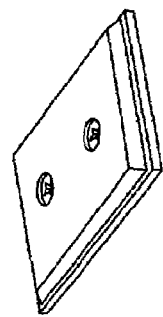
FIG. 29 depicts a perspective view of one of the Teflon® pressure pads, constructed in accordance with the present invention.

FIG. 28 depicts an exploded perspective view of the left primary sliding section 108 and the right primary sliding section 110. The primary trunnion mounts 18 have been omitted for clarity. The right primary sliding section 110 is composed of a box section 124 and two fork members 126. The left primary sliding section 108 is composed of a box section 128 and a tongue member 130. The tongue member 130 translated under the shelf 132 of the right primary sliding section 110 while the fork members 126 slide under the ledges 134 on the left primary sliding section 108. The unique interlocking of the left primary sliding section 108 and the right primary sliding section 110 adequately support a great deal of weight when they have been extended. Conventional Teflon® wear pad 136 illustrated in FIG. 29 will be placed in a variety of locations to minimize frictional drag when the parts are moved. This application will also apply to the secondary box members 24A and the right and left secondary sliding sections 112 and 114.

Figure 30:
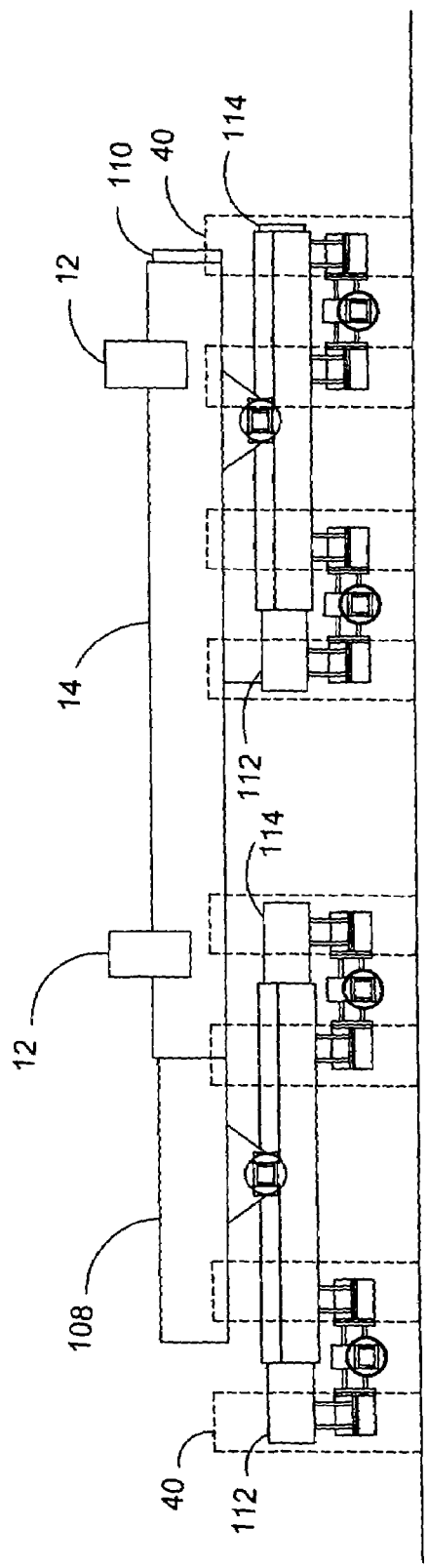
FIG. 30 depicts a back view of the expanding independent load suspension system with the left side extended and the right side retracted, constructed in accordance with the present invention.

FIG. 30 depicting a back view of the expanding independent load suspension system 10 with the left primary sliding section 108 extended and the right primary sliding section 110 retracted further clarifying the fact that with variable dimensions in suspension system it will enable infinite adjustment of the wheel locations on irregular surfaces. The illustration clarifies that when rounding a super elevated turn one side can be extended while the other can be retracted.

Figure 31:
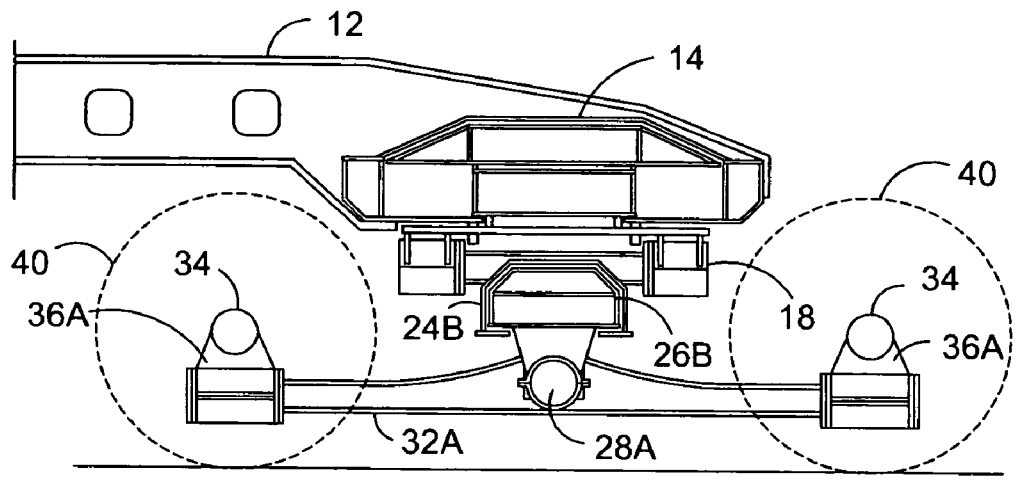
FIG. 31 depicts a left side view of the expanding independent load suspension system with an alternate embodiment of the secondary box member and sliding sections, constructed in accordance with the present invention.
Figure 32:
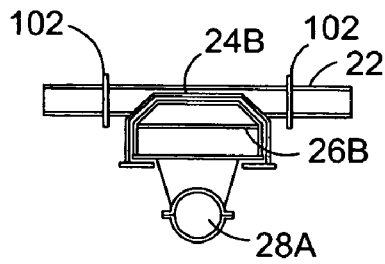
FIG. 32 depicts an end view of the alternate embodiment of the secondary box member and sliding sections, constructed in accordance with the present invention.
Figure 33:
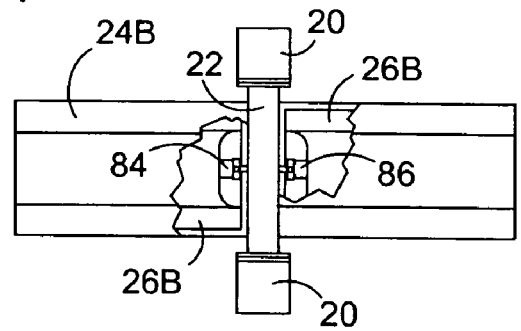
FIG. 33 depicts a top view of the alternate embodiment of the secondary box member and sliding sections, constructed in accordance with the present invention.
Figure 34:
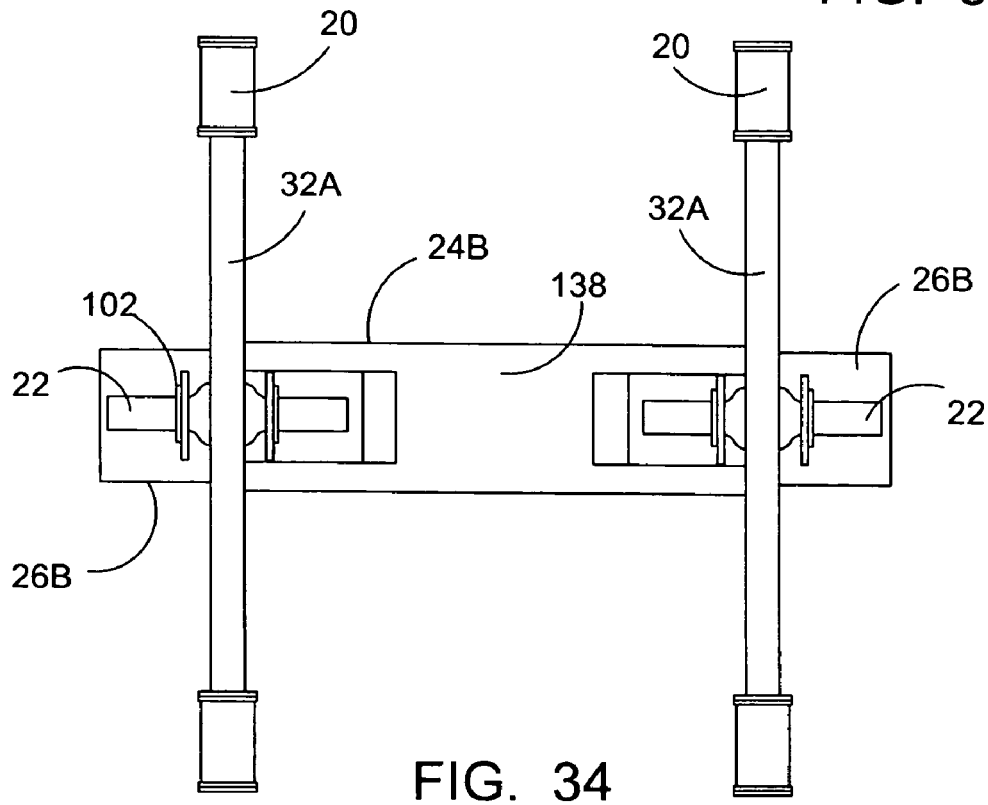
FIG. 34 depicts a bottom view of the alternate embodiment of the secondary box member and sliding sections, constructed in accordance with the present invention.

FIG. 31 depicts a left side view of the expanding independent load suspension system 10 with an alternate embodiment of the secondary box member 14 depicting a secondary box member 24B and typical sliding sections 26B. FIG. 32 depicts an end view of the alternate embodiment of the secondary box member 24B narrower than the secondary box member 24A allowing the configuration of the sliding sections 26B to be the same while achieving adequate support. FIG. 33 depicts a top view of the alternate embodiment of the secondary box member 24B with a portion broken away to reveal the hydraulic cylinders 84 and 86. FIG. 34 depicts a bottom view of the alternate embodiment of the secondary box member 24B and sliding sections 26B displaying the bottom panel 138.

Figure 35:
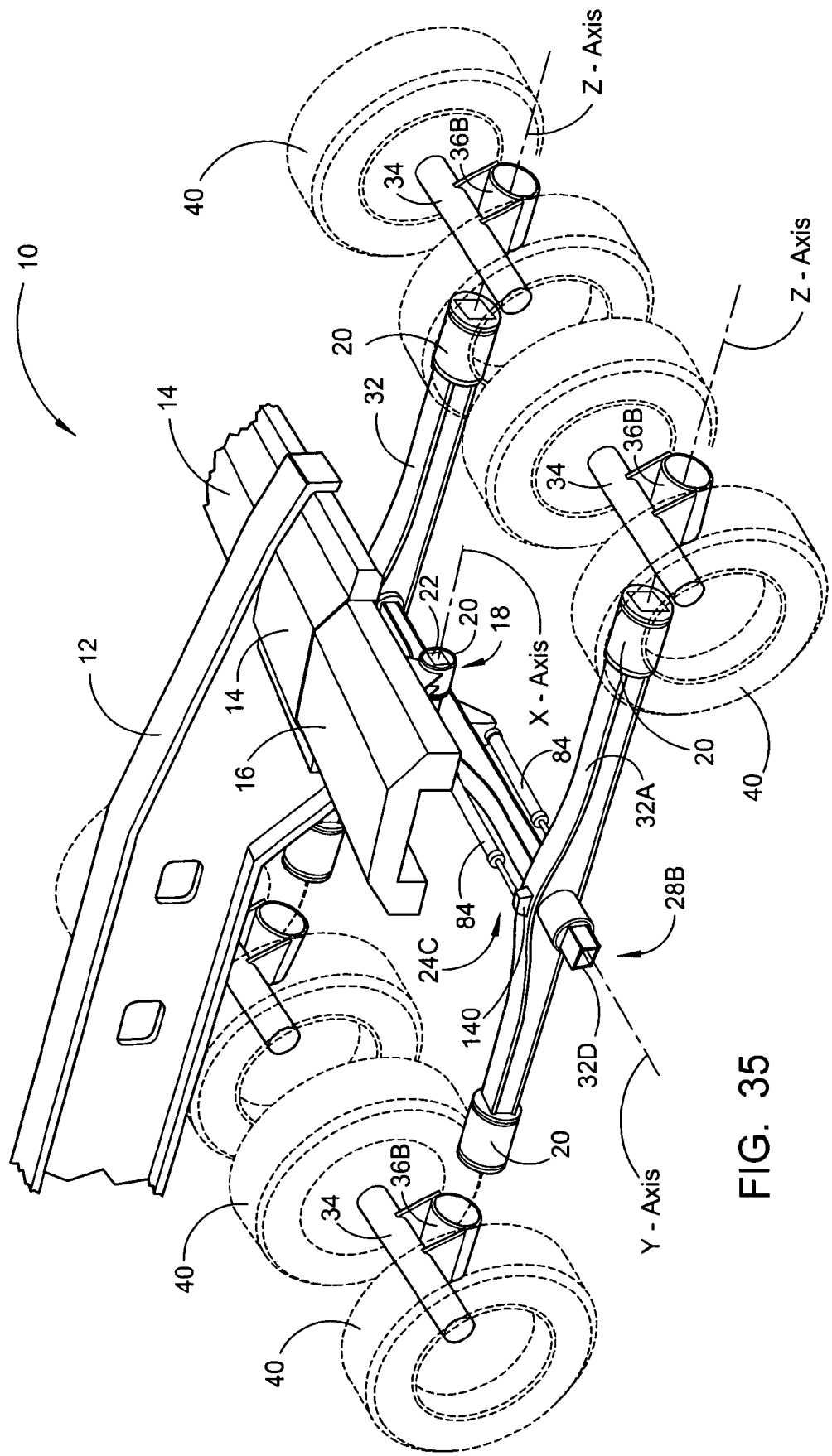
FIG. 35 depicts a perspective drawing of one side of the expanding independent load suspension system with a walking beam with hydraulically actuated longitudinal adjustment of the bushing mounts replacing the secondary box member and the right and left secondary sliding sections, constructed in accordance with the present invention.

FIG. 35 depicts a perspective drawing of one side of the expanding independent load suspension system 10 with a walking beam 24C with hydraulically actuated longitudinal adjustment of the cylindrical bushing mounts 140 configured on the square walking beam 32A replacing the secondary box member 24A and the right and left secondary sliding sections 112 and 114.

FIG. 35 depicts a top view of the square walking beam 32F with expanded central section 52 further emphasizing the expanded width of the flat top wall 52 and flat bottom wall 54 while using the secondary trunnion 28B having an enlarged tubular member 142 similar to the tubular axle mount 36B with an enlarged bushing 20. FIG. 37 additionally clarifies that the flat sidewalls 56 can be enlarged through the central section 58 to strengthen the structural integrity while still remaining within the scope of this patent.

FIGS. 38, 39 and 40 depict a three of geometric configurations of the walking beam 32A, 32B, 32C, 32D, 32E and 32F, with flat sides 144 and curved sides 146 to match a like configured orifice in the bushing 20 capable of alignment adjustments described and within the scope of this patent. These figures endeavor to emphasize the variety of shapes in the walking beams 32 and the bushing 20 that may be used by the expanding independent load suspension system for correcting the problems arising from the prior art tubular support member 46 on the walking beam 42.

The expanding independent load suspension system 10 shown in the drawings and described in detail herein discloses arrangements of elements of particular construction and configuration for illustrating preferred embodiments of structure and method of operation of the present invention. It is to be understood, however, that varying combination of elements of different construction and configuration and other arrangements thereof, other than those illustrated and described may be employed for providing a expanding independent load suspension system 10 in accordance with the spirit of this invention, and such changes, alternations and modifications as would occur to those skilled in the art are considered to be within the scope of this invention as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

We claim:

1. An expanding independent load suspension system comprising:
   (a) a primary box member fixably attached to a frame of a load carrying transport vehicle;
   (b) a pair of opposing primary sliding members capable of expansion and contraction, located below said primary box member;
   (c) a primary trunnion, housing a primary bushing and a primary journal;
   (d) a secondary box member, located below said primary journal, housing a pair of opposing secondary sliding members capable of expansion and contraction;
   (e) a secondary trunnion, housing a secondary bushing and a secondary journal; and
   (f) a walking beam, fixably attached to said secondary journal, having wheel mounting bushings positioned at both ends of said walking beam, wherein a group of two or more wheels attached to an axle are mounted on said wheel mounting bushings using a mounting bracket;
   whereby said primary bushing, said secondary bushing and said mounting bushings allow said primary journal to pivot about an axis that is parallel to the frame of a load carrying vehicle, and said secondary journal to pivot about an axis perpendicular to the same frame of the same load carrying vehicle, and said axle, having said group of two or more wheels attached thereto, to pivot about an axis parallel to the same frame of the same load carrying vehicle for the purpose of enabling said sliding members and wheel groups to independently pivot in response to changing road surface topography.

2. The expanding independent load suspension system according to claim 1, wherein said pair of opposing primary sliding members capable of expansion and contraction, expand in order to separate two or more groups of two or more wheels, and contract to bring said two or more groups of two or more wheels back together.

3. The expanding independent load suspension system according to claim 1, wherein said a secondary box member, located below said primary journal, housing a pair of opposing secondary sliding members capable of expansion and contraction, expand in order to separate one or more groups of two or more wheels, and contract to bring said one or more groups of two or more wheels back together.

4. The expanding independent load suspension system according to claim 1, wherein said walking beam is a non-circular walking beam.

5. The expanding independent load suspension system according to claim 1, wherein said walking beam is a square walking beam.

6. The expanding independent load suspension system according to claim 1, wherein said primary and secondary journals are non-circular in shape.

7. The expanding independent load suspension system according to claim 6, wherein said primary bushing, said secondary bushing, and said mounting bushings are cylindrical in shape and have non-circular orifices which accept said non-circular walking beam ends and said non-circular primary and secondary journals.

8. The expanding independent load suspension system according to claim 1, wherein said walking beam includes a walking beam with its ends curved downwardly to produce a pre-load bow.

9. The expanding independent load suspension system according to claim 1, wherein said primary, secondary and mounting bushings are constructed of high density thermoplastic which allows for long wear and a good lubricating effect.

10. The expanding independent load suspension system according to claim 1, wherein said walking beam is constructed to include a gradually enlarged and thereby thickened mid-section, where said secondary journals are fixably attached.

11. The expanding independent load suspension system according to claim 1, wherein said walking beam is replaced by a single axle suspension beam having a non-circular shape, means for expansion actuation, and an air bag cushion.

12. The method for making an expanding independent load suspension system comprising the steps of:
   (a) providing a primary box member fixably attached to a frame of a load carrying transport vehicle;
   (b) providing a pair of opposing primary sliding members capable of expansion and contraction, located below said primary box member;
   (c) providing a primary trunnion, housing a primary bushing and a primary journal;
   (d) providing a secondary box member, located below said primary journal, housing a pair of opposing secondary sliding members capable of expansion and contraction
   (e) providing a secondary trunnion, housing a secondary bushing and a secondary journal; and
   (f) providing a walking beam, fixably attached to said secondary journal, having a wheel mounting bushings positioned at both ends of said walking beam, wherein a group of two or more wheels attached to an axle are mounted on said wheel mounting bushings using a mounting bracket;
   whereby said primary bushing, said secondary bushing and said mounting bushings allow said primary journal to pivot about an axis that is parallel to the frame of a load carrying vehicle, said secondary journal to pivot about an axis perpendicular to the same frame of the same load carrying vehicle, and said axle, having said group of two or more wheels attached thereto, to pivot about an axis parallel to the same frame of the same load carrying vehicle.

13. The method for making an expanding independent load suspension system according to claim 12, wherein said step of providing a pair of opposing primary sliding members capable of expansion and contraction, whereby said sliding members expand in order to separate two or more groups of two or more wheels, and contract to bring said two or more groups of two or more wheels back together, further includes the step of providing means for actuating the expansion and contraction of said opposing primary sliding members.

14. The method for making an expanding independent load suspension system according to claim 13, wherein said step of providing means for actuating the expansion and contraction of said opposing primary sliding members, wherein said means for actuation includes hydraulic, electrical and electronic actuation.

15. The method for making an expanding independent load suspension system according to claim 12, wherein said step of providing a walking beam includes the step of providing a non-circular walking beam.

16. The method for making an expanding independent load suspension system according to claim 12, wherein said steps of providing a primary bushing, providing a secondary bushing and providing a mounting bushing further includes the steps of providing said primary bushing, said secondary bushing, and said mounting bushings which are cylindrical in shape and have non-circular orifices which accept said non-circular walking beam ends and said non-circular primary and secondary journals.

17. The method for making an expanding independent load suspension system according to claim 12, wherein said step of providing a walking beam further includes the step of providing a walking beam with its ends curved downwardly to produce a pre-load bow.

18. The method for making an expanding independent load suspension system according to claim 11, wherein said step of a primary bushing, providing a secondary bushing and providing a mounting bushing further includes the steps of providing said primary bushing, said secondary bushing, and said mounting bushings which are constructed of high density thermoplastic which allows for long wear and a good lubricating effect.

19. The method for making an expanding independent load suspension system according to claim 11, wherein said step of providing a walking beam further includes the step of providing a walking beam which is constructed to include a gradually enlarged and thereby thickened mid-section, where said secondary journals are fixably attached.

20. The method for making an expanding independent load suspension system according to claim 11, wherein said step of providing a walking beam further includes the steps of providing a single axle suspension beam.

* * * * *